March 2, 1965  C. P. KUEVER  3,171,316
PUNCH APPARATUS
Filed July 6, 1961  5 Sheets-Sheet 1

INVENTOR
CECIL P. KUEVER
BY
ATTORNEYS

INVENTOR
CECIL P. KUEVER

BY *Mixie K. Shirley*

ATTORNEYS

March 2, 1965  C. P. KUEVER  3,171,316
PUNCH APPARATUS
Filed July 6, 1961  5 Sheets-Sheet 3

INVENTOR
CECIL P. KUEVER
BY
ATTORNEYS.

March 2, 1965 C. P. KUEVER 3,171,316
PUNCH APPARATUS
Filed July 6, 1961 5 Sheets-Sheet 4

INVENTOR.
CECIL P. KUEVER

March 2, 1965 C. P. KUEVER 3,171,316
PUNCH APPARATUS

Filed July 6, 1961 5 Sheets-Sheet 5

INVENTOR.
CECIL P. KUEVER
BY
*Murio U Riley*
ATTORNEYS.

United States Patent Office 3,171,316
Patented Mar. 2, 1965

3,171,316
PUNCH APPARATUS
Cecil P. Kuever, 3815 Pope St. SE., Washington, D.C.
Filed July 6, 1961, Ser. No. 122,196
19 Claims. (Cl. 83—451)

This invention relates generally to punching devices and more particularly to an improved punching device for accurately and quickly punching holes in masking sheets used in preparing printing plates having multiple images.

In making printing plates, multiple negatives or positives, it is customary to photographically repeat the image on a sensitized surface by use of a single negative or positive derived photographically from an original drawing.

To then provide a plurality of images, there is a need for what is termed "stepping over and up" of an image on a sensitized plate or negative type material to provide multiple images, each in exact physical relationship to the other images. Frequently, it is necessary also to prepare more than one plate with multiple images on each and with each representing a color of a multiple color printing job. In such an instance, the relationship of the images to each other must provide for exactly registering not only for one color but for all colors in the multiple color operation.

To obtain such stepping over and up, the key, or single image, negative is registered to an outline of the printed piece as properly positioned and drawn on a sheet of masking material, usually called "golden rod" in the trade. This negative must have a predetermined relationship to a pattern of stepping holes made in the masking paper. Thus, when the image is stepped over, during photographic reproduction on a light table, the successive exposures will be properly positioned by shifting of the masking sheet between exposures the distance between openings punched in the sheet, which distance must correspond exactly to the width of the printed job including margin and trim. Normally, the light table is provided with a master strip having a series of holes spaced apart exactly the height of the printed job inclusive of margin and trim, so that, by stepping the masking sheet first horizontally with respect to one pair of master strip holes, and then vertically on the master strip, successive exposures may be made which are first stepped over and then up, or vertically. In both instances of stepping over and up, there must be as many pairs of locating holes plus one additional pair provided in the masking sheet and in the master strip as there are steps, or exposures.

In order to prepare a masking sheet containing the key negative, it has been customary in the trade to manually line the masking sheet on the light table with horizontal and vertical lines carefully drawn with a T-square and properly and exactly spaced apart as determined by the width and height of the copy including trim and margins. Next, there is provided strips of masking material having holes spaced apart the same width as previously established and these are fixed to the masking sheet to establish a relationship with the negative which will give the appropriate horizontal or vertical duplication of images on the printing plate. Obviously, this procedure is slow and cumbersome and subject to drafting errors.

It has been suggested that a punching device be used as a substitute for parts of the above described manual procedure. One proposed apparatus involves a work table having a fixed locating pin positioned near one corner. A movable locating pin is provided along one edge of such table and a movable punch is provided along a second edge perpendicular thereto. By turning the masking sheet 90° and placing a corner of the masking sheet over the fixed locating pin and moving the movable locating pin to the proper selected spacing for vertical or horizontal stepping for receipt of the second hole of a previously prepared pair, the punch may be moved an appropriate distance and a third hole punched in the masking sheet. The masking sheet is then removed, turned over or inverted, positioned on the locating pins and a fourth hole punched opposite the third hole. The masking sheet is then again removed, inverted, turned 90°, moved to engage the third and fourth holes over the locating pins to punch the next hole. The described procedure is repeated for as many pairs of holes as required. Each time one of a pair of holes is separately punched, it is necessary to remove the masking sheet from the table and repeat the complex procedure described. Obviously, this is tedious and time consuming.

It is a primary object of the present invention to provide a punching device for stepping masking sheets which will obviate the disadvantages of the known devices and which is easier to use and more efficient in operation.

Another important object of the present invention is to provide means for preparing a printing plate in a more economical and accurate manner, such means taking the form of a punch device which does not require removal of a masking sheet from its work surface until an entire series of holes, necessary for stepping, has been punched therein.

Yet another object of the invention is to provide an improved punch device which enables the cutting of a pair of aligned holes simultaneously, one at each side of the work sheet.

A further object of the invention is to provide an improved punch device having a slidable punch carriage, a lockable gauge block and a stop so arranged and connected to the carriage and block as to enable punching a series of equally spaced holes, more or less automatically, by merely sliding the carriage to a set distance permitted by the stop, punching, unlocking and sliding the gauge block to the carriage, locking the gauge block, and repeating this procedure as many times as necessary to punch the required number of holes.

A still further object of the invention is to provide an improved punch device having a slidable punch carriage for punching holes at opposite sides of a masking sheet, said carriage being adapted to removably carry a straight edge parallel to a line between said holes to be punched, and said straight edge being adapted to slidingly and clampingly receive various accessory devices for lining, centering or holding a negative with respect to the masking sheet.

Yet another object of the invention is to provide an improved punch device which will enable the cross punching of a series of holes at opposite sides of a masking sheet, for the purpose of "stepping over" of said sheet in a later printing process and which is also adapted for punching holes up the masking sheet on the remaining two sides of the sheet for purposes of "stepping up."

Still another object of the invention is to provide an improved punch device of the character indicated above which is adapted to punch holes anywhere on the sheet in both directions and in exact register.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts throughout the several figures and in which:

Referring now more particularly to the drawings, there is shown a preferred embodiment of the invention as comprising a flat base 10 above which is mounted a work surface 12 on four corner pillars designated 14. The work surface is preferably rectangular in shape and is secured to the pillars by means of screws 16 whose heads are countersunk in surface 12 to present a flat uninterrupted working surface.

Figure 1:
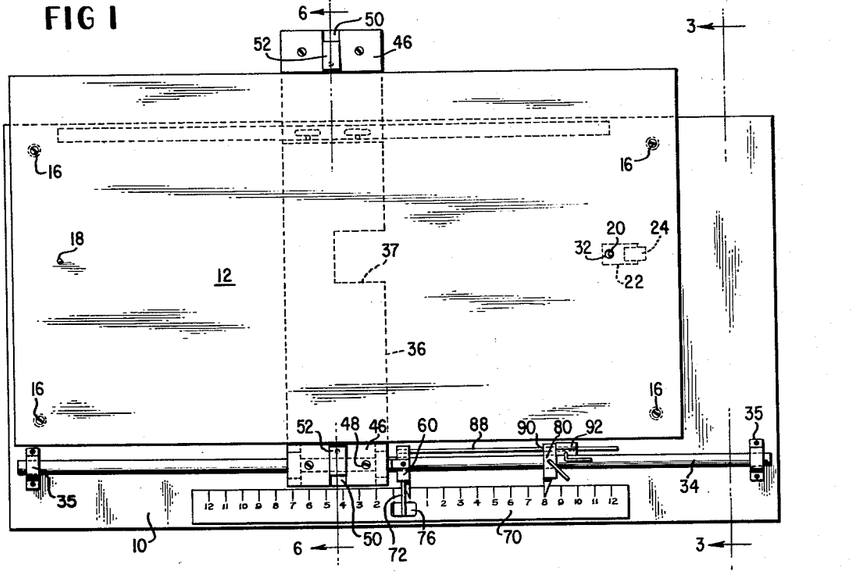
FIG. 1 is a plan view of a punch apparatus constructed in accordance with the invention.
Figure 2:
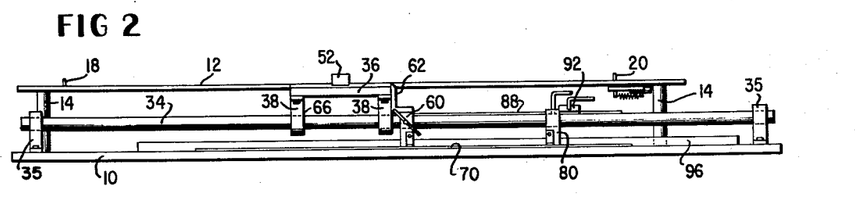
FIG. 2 is a front elevational view of the punch device shown in FIG. 1.
Figures 4, 5:
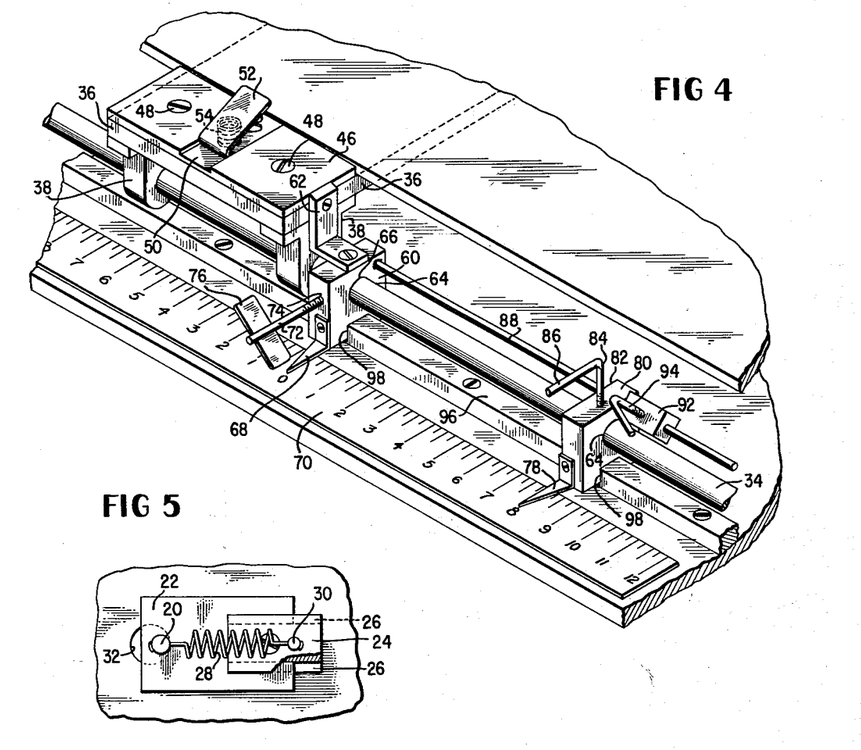
FIG. 4 is an enlarged fragmentary perspective view showing the front of the punch carriage and its relation to the guage block and stop utilized in setting the punched hole spacing.
FIG. 5 is an enlarged bottom view of a detail comprising the adjustable locating pin taken from line 5—5 of FIG. 3 and looking in the direction of the arrows.

Approximately centrally, near the left edge of the work surface, is an upstanding work locating pin 18 adapted to be received in a locating hole formed centrally and at one side of a masking sheet which constitutes the work. Horizontally aligned with this locating pin is a second and movable pin 20 near the opposite side of the work surface. As best shown in FIGS. 1 and 5, the movable pin 20 is carried by plate 22 which is recessed to slide along a retaining guide 24 fixed to the under side of the work surface or table in any desired or suitable way. The guide 24 is channeled at opposite sides 26 to provide underhanging flanges which prevent the plate 22 from separating from the work table. A coil spring 28 secured at one end to pin 30, which is fixed to the guide 24, is fastened at the other end to the bottom of locating pin 20 causing the latter to be urged resiliently to the right as viewed in FIG. 5. Pin 20 extends upwardly through the work table passing through an aperture 32 therein. The described construction provides rectilinear movement of pin 20 for a short distance defined by the diameter of aperture 32, and thus when a masking sheet is placed over pins 18 and 20, the latter pin is urged to the right stretching the masking sheet to lie flat and tensioned on the work surface 12.

Figure 3:
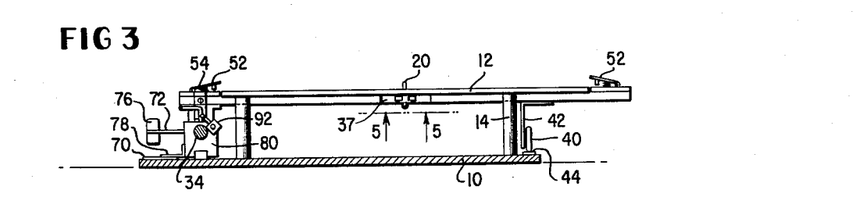
FIG. 3 is a side elevational view taken from line 3—3 of FIG. 1 and looking in the direction of the arrows.
Figure 6:
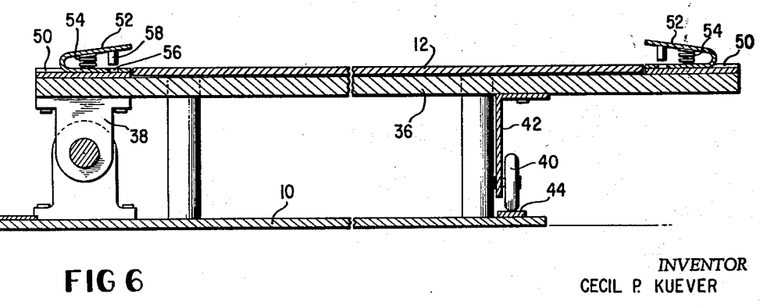
FIG. 6 is an enlarged, sectional view taken along line 6—6 of FIG. 1 and looking in the direction of the arrows.

A rod 34 is mounted parallel to and above the base plate 10 by means of supporting brackets 35 at each end. Preferably, the rod is parallel to the lower horizontal edge of the work table 12, as viewed in FIG. 1. A punch carriage 36 extends for more than the width of the work table, and is movable therealong between the longitudinally spaced pillars 14. The carriage is positioned, preferably, between the base plate and the work table and is supported at its front end by a pair of bearings 38 which slide along the bar 34. The rear end of carriage 36 is supported by a wheel 40, see FIGS. 3 and 6, mounted on the inverted L-shaped bracket 42 and which rolls along a flat track 44 fastened to the base plate. The carriage is centrally recesesd at 37 to accommodate the pin supporting structure 22, 24 when approaching its limit of travel to the right.

The front and rear end portions of carriage 36 are raised to a level flush with the top of the work surface 12 by means of surface plates 46 fastened thereto by screws 48. Aligned channels 50 are formed in the surface plates and in each of these is fastened a punch 52. These punches may be of any suitable construction, a preferred embodiment comprising leaf springs bent into the shape of a V, laid on their sides, and pressed apart by small coil springs 54. The V springs are aligned by the walls of channels 50 and are welded or otherwise secured to the plates 46. The lower side of each punch 52 is formed with an opening 56 adapted to receive the punch pin 58, dependent from the upper side. The pins 58 pass through a masking sheet held on the work table 12 and extending onto the surface plates 46.

To enable locking of the punch carriage at a desired position, there is provided a block 60 secured to the carriage at one side by means of bracket 62. The block is formed with a central aperture 64 which slidably receives the bar 34. At least the right hand side 66 of the block is flat and polished smooth to serve as a bearing surface for reasons to be described later. Registering with surface 66, is one edge of a flat pointer 68 which extends forwardly and overlies a scale 70 mounted flat on the base plate 10. A locking pin 72 having a manipulating wing 76 extends through and threadedly engages aperture 74 in the front surface of block 60. The wing may be turned into engagement with the rod 34 for locking the punch carriage and reversely turned to disengage the rod for unlocking the carriage and permitting sliding movement thereof. Another and similar block 80, which may be termed a gauge block, is slidably mounted on rod 34 in the same manner as block 60. At least the left surface 82 of the second block as viewed in FIG. 4, is squared, flattened and polished so that it may closely abut the surface 66 of block 60 when the two blocks are pushed together. Block 80 carries a pointer 78, similar to 68, whose reference edge is aligned with the surface 82. For locking block 80, there is provided a pin 84 which is threadedly engaged in an aperture opening in the top of the block. The right angle portion 86 of the pin may be turned to engage the pin against bar 34 and lock the gauge block.

A straight rod 88 is firmly secured to the block 60 by welding, or other suitable means, and extended therefrom toward block 80 and parallel to the rod 34. The rod 88 extends through an aperture 90 in block 80 and protrudes from the other side. Slidably mounted on the outer end of the rod 88 is a stop member, or block 92 which may be locked to the rod by means of a locking pin 94 similar to the pin 84. Desirably, the abutting faces of blocks 80 and 92 are also squared and polished. As the blocks 60 and 80 are moved along the rod 34, they are prevented from turning by means of a rail 96 which is received in recesses 98 in each of the blocks. While this is a preferred construction, it will be readily understood that rail 34 may be irregularly or rectangularly shaped rather than circular in cross-section in which event, the rail 96 would not be needed and could be eliminated.

Figure 7:
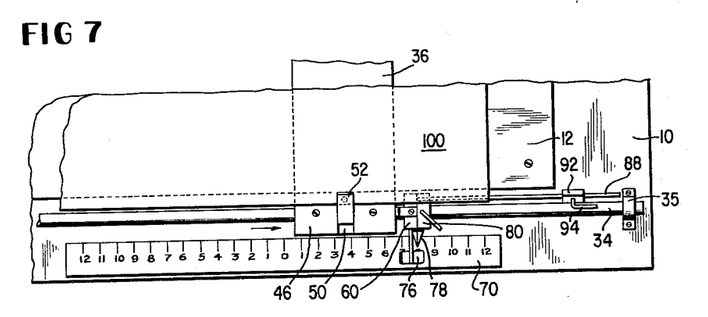
FIGS. 7, 8 and 9 are fragmentary plan views illustrating the positioning of the punch carriage with respect to its associated guage block and stop at three different times during the cutting of a series of holes.
Figure 8:
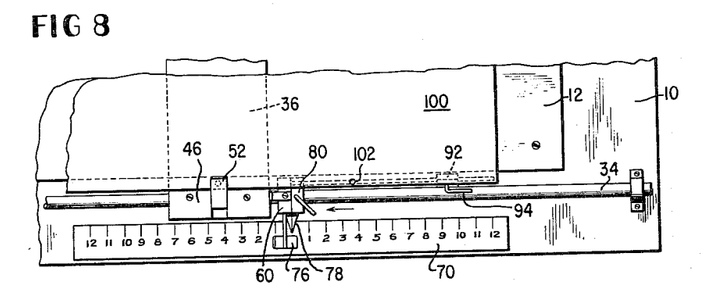
Figure 9:
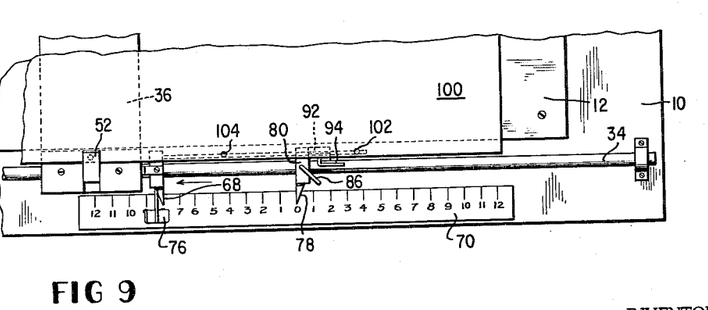

To utilize the above described apparatus in the making of a printing plate, the form, picture, copy, or other item to be printed, is first squared up on a line-up, or light table. Center marks are made in both directions on the original copy and a masking sheet generally of standard size and having pre-punched center locating holes at each side, is drawn up with centering marks to match the correct position for placement of the negative of the original to be copied. In placing the outline and centering marks on the masking sheet, the number of steps, or exposures, to be taken are considered and the line between locating holes in the masking sheet is used as a reference from whose center the outline is drawn properly positioned in two directions. The form is then exposed and a negative thereof is aligned with the center marks on the masking sheet and taped to the latter. Thus prepared, the masking sheet, identified at 100 in FIGS. 7, 8 and 9, is placed on the work surface 12 with its locating holes positioned about the pins 18 and 20, FIG. 1. The adjustable, spring tensioned pin 20 will move to the right and stretch the masking sheet so that it will lie flat and fully extended on the work surface.

If then, for example, a series of holes are to be punched in the masking sheet eight inches apart as representing the full width of the item to be copied including margin and trim, the punch carriage is positioned with its indicating pointer 68 registered with zero on the scale 70 and the block 60 and carriage are locked in this position by manipulation of the finger piece 76. The scale 70 is centered with respect to the locating pins 18 and 20 and is provided with graduations running in both directions from the zero, or center point. The gauge block 80 is then moved to the eight inch mark at the right, as shown in FIGS. 1 and 4, and locked in this position. Now the stop 92 is moved against the right side of the gauge block 80 and locked to rod 88.

The apparatus is now ready for the punching operation as exemplified in FIGS. 7, 8 and 9. The block 60 is unlocked and pushed to the right, FIG. 7, until it abuts gauge block 80 where it may be held only or locked. Both punches 52 are then depressed to cut the initial pair of holes 102 at the opposite sides of the masking sheet 100. One of such holes may be seen in FIG. 8. Now, the carriage block 60 is released and pushed to the left until stopped by engagement of stop 92 with block 80 where the carriage is locked in the position of FIG. 8. A second pair of holes, 104, FIG. 9, is then cut by again depressing the punches 52. The block 80 is released and pushed to the left as indicated by the arrow in FIG. 8 until stopped by abutment with block 60. At this point the gauge block is locked. The carriage is released, moved to the left until stop 92 strikes the gauge block, and locked in the position of FIG. 9. A third pair of holes is then punched in the masking paper. The described procedure of releasing the gauge block and moving it to abut the carriage block 60, locking the gauge block, releasing the carriage block and moving the carriage until limited by the stop 92, may be repeated as many times as necessary to provide the required number of pairs of holes at the edges of the masking paper.

The masking sheet, as thus provided with stepping holes, and after appropriate cutting away of the outline about the key negative and opaquing of such negative is placed on a light table mounted with proper reference to the plate to be made by means of a pair of dowels positioned in a master strip and entered into the first set of punched holes in the masking sheet. A successive number of exposures may then be made moving the masking sheet between each exposure so as to step the sheet the required distance each time as determined by the spacing of the openings punched in the masking sheet. If both horizontal and vertical stepping are to be performed, the master strip is provided with an adequate number of holes properly spaced for the dimension of the image in the second direction and the masking sheet is moved from one pair of these openings to the next between vertically stepped exposures. Obviously, having followed the general procedure thus outlined, when complete exposures have been made and the plate is developed, the multiple images on the plate will be properly spaced for accurate registration of the matter to be printed.

In FIGS. 10–17, is illustrated a modified embodiment of the invention together with various accessory devices for properly affixing a negative to a masking sheet and providing said sheet with "stepping up" and "stepping over" holes without the need for removing the masking sheet to any other work surface. As shown in these figures, the work surface 112 is suitably supported above the base 110 by upstanding end walls 111. In place of the guide rod 34 and the guide bar 96, there is provided a guide rail 134 of inverted T-shape secured to the under side of the work table 112 by means of screws 135 and parallel and adjacent to the lower horizontal edge of the table as viewed in FIG. 10. A metal strip 113 inset in the upper surface of the work table is secured by the same screws 135. The work locating pins 118 and 120 are removably located in openings in table 112 at the side thereof and preferably off center toward its lower horizontal edge. Another pair of openings 115 and 117 is provided in the strip 113 for removably receiving the pins 118 and 120 for a purpose to be later described.

Figure 11:
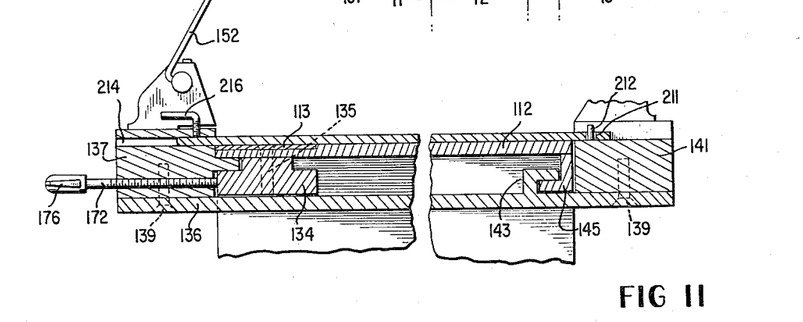
FIG. 11 is a sectional view taken along line 11—11 of FIG. 10 and looking in the direction of the arrows.
Figure 12:
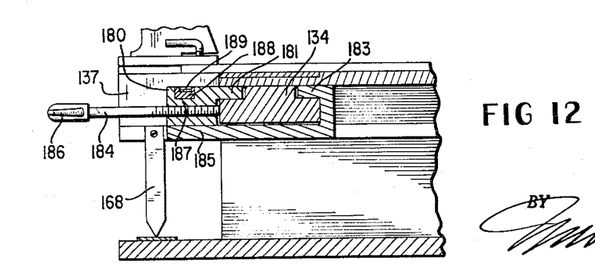
FIG. 12 is a fragmentary sectional view taken along line 12—12 of FIG. 10 and looking in the direction of the arrows.

The punch carriage comprises a front block 137 and a rear block 141 which carry the punches 152. The blocks are secured together by a strap 136 extending beneath the work table 112. As best shown in FIG. 11, block 137 has a projecting flange which rides in a channel formed between the guide rail 134 and the under surface of the work table 112. The strap 136 is provided with an angle flange 143 which slidably coacts with a reversed L-shaped rail 145 secured to the under side of the work table at the rear edge thereof. A screw 172, having an operating wing handle 176 passes through an aperture in block 137 to lockingly engage the rail 134. When the punch carriage is moved along the rail to a desired position and the lock screw 172 is tightened, the rear block 141 of the punch carriage is pulled snugly against the rear rail 145 so that the entire punch carriage assembly is firmly held in a position perpendicular to the front edge of the work table and perpendicular to a line between the pins 118 and 120.

A guage block 180, having a projecting flange 181 which rides in the forward channel between the rail 134 and the under surface of the work table, is additionally provided with a lower support member 185 having upwardly and inwardly extending flanges. The latter flange 183 rides in the rear channel formed between the rail 134 and the work table. A locking screw 184, having a manipulating wing handle 186, passes through the guage block 180 for locking the block to the rail 134. As apparent from FIG. 12, this structure provides a slidable guage block similar to that labeled 80 in FIG. 1. The upper surface of block 180 is provided with a channel 187 which slidably receives a flat, rectangular cross section rod 188 which is secured at one end to the punch carriage 137. Inset within the upper surface of the strap 188 is a scale 189.

Figure 13:
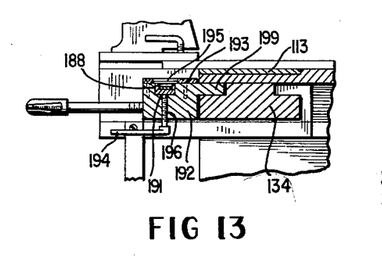
FIG. 13 is a fragmentary sectional view taken in the direction of the arrows from line 13—13 of FIG. 10.
Figure 14:
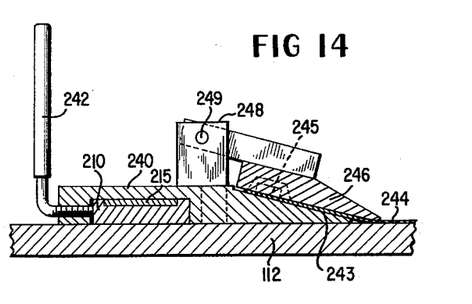
FIG. 14 is a fragmentary sectional view taken in the direction of the arrows along line 14—14 of FIG. 10.

The stop member 192, FIG. 13, comprises a block having a rearwardly projecting flange 199 which is guidingly and slidably received in the channel between the rail 134 and the work table 112. The block 192 is provided with a channel 191 which slidably receives the strap 188. A cover plate 193 is secured by screws, or other suitable means, to the upper surface of the stop member 192 and serves to hold the member in slidable engagement with the strap 188. A window 195 is formed in the cover plate through which the scale 189 carried by the strap 188 is visible. For locking the stop member 192 to the strap 188, there is provided a locking screw 196 having a forwardly extending handle 194. The screw extends upwardly through an aperture in the bottom of the block 192 into engagement with the strap 188.

Figure 10:
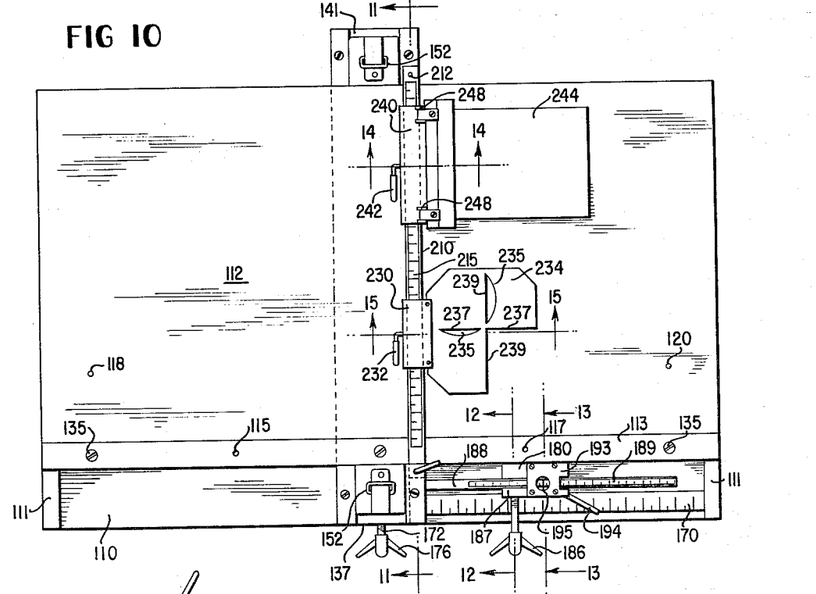
FIG. 10 is a plan view similar to FIG. 1 but of a modified apparatus.

Removably carried by the punch carriage is a straight edge 210. The straight edge is provided with an opening 211 at one end adapted to be fitted over a pin 212 carried by the rear block 141 of the punch carriage. When the straight edge is assembled to the punch carriage, the forward end of the straight edge is slidably received in a side opening channel 214 in the forward block 137 of the punch carriage. The straight edge is firmly fixed in such position by operation of the screw clamp 216, which passes through the upper surface of block 137 and firmly engages the top surface of the straight edge to lock the straight edge in place. When thus locked, the right edge of the straight edge as viewed in FIG. 10 is perpendicular to the lower, or front, edge of the work table and perpendicular to a line drawn between the locating pins 118 and 120. Thus, the straight edge 210, which carries a scale 215 inset in its upper surface, is adapted for ruling vertical lines, as viewed in FIG. 10, on a masking sheet laid on the work surface 112.

Figures 16, 17:
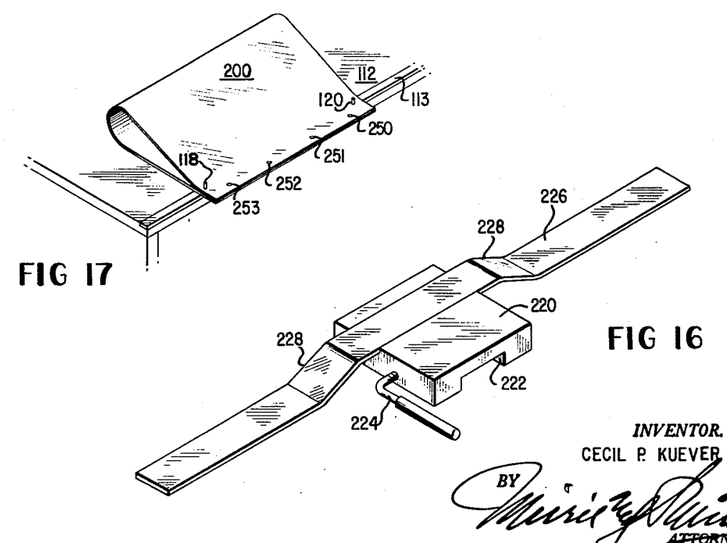
FIG. 16 is a perspective view of an accessory device for horizontal lining and adapted to be slidably engaged with a straight edge of the apparatus shown in FIG. 10.
FIG. 17 is a perspective view of a masking sheet folded and engaged over the work locating pins and showing a series of holes punched for "stepping up."

An accessory device for ruling horizontal lines is shown in FIG. 16 as comprising a block 220 having a channel in its under surface 222 which slidably receives the straight edge 210. For locking the block 220 to the straight edge, there is provided a screw type clamp 224 which passes through an aperture in the wall of the block to engage the straight edge 210 when the device is assembled. The straight edge 226 is secured in a groove in the upper surface of the block 220 and desirably is provided with a pair of bent portions 228 in order to enable the ends of the straight edge to lie flat on the work surface. It will be readily understood that the described device, when applied to the straight edge, is movable along the length of the latter and may be clamped in any desired position for ruling lines parallel to the work locating pins 118 and 120 on a masking sheet on the work table.

Figure 15:
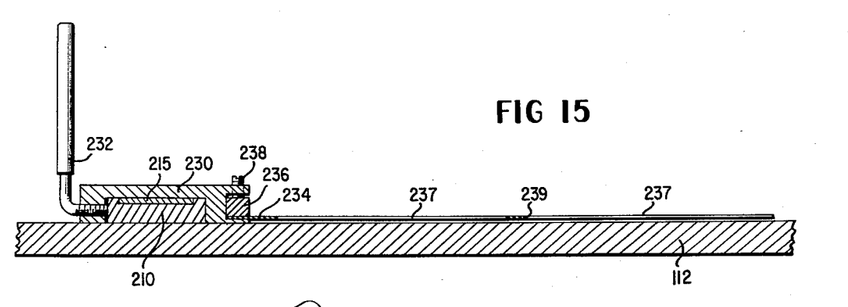
FIG. 15 is a sectional view taken in the direction of the arrows from line 15—15 of FIG. 10.

A somewhat similar auxiliary device for accurate placement of centering crosses on the masking sheet is illustrated in FIGS. 10 and 15 as comprising a block 230 removably and slidably attachable to the straight edge 210 by means of a channel in its under side similar to the channel 222 previously described on the horizontal straight edge. A locking member 232 is provided for clamping the block 230 in any desired position along the straight edge. A leaf 234, adapted to lie flat over the work surface 112, is secured to block 230 in a channel therein by means of a bar 236 clamped by the screws 238. The leaf is provided with a pair of crescent shaped cutouts 235 and a rectangular shaped cutout so arranged as to provide edges 237 and 239 which are perpendicular to each other, the edges 239 being parallel to the straight edge 210. Accordingly, when the device is attached to the straight edge and moved to a desired location over the work table 112, a pencil may be inserted and moved along the edges 237 and 239 to mark a cross for centering purposes on a masking sheet carried by the work surface.

Yet another useful auxiliary device, similar to those described above, is provided and illustrated in FIGS. 10 and 14. This device comprises a block 240 having a channel in its under surface for removably and slidably receiving the straight edge 210 to which it is clamped by means of the locking device 242. The block 240 has a downwardly inclined surface 243 at one side which carries a pair of upstanding pins 245. A negative 244 with openings at one side is placed on the inclined surface with the openings receiving the pins 245. To clamp the negative in place, a member 246 is pivotally secured to the block 240 by means of a pair of pivot pins 249 carried between pairs of upstanding lugs 248. Thus, a negative may be readily inserted on the carrier 240 by turning the part 246 about its pivots and then returning the part to clamp the negative in place. When so clamped the negative is aligned with its edges perpendicular to the straight edge 210 and may be moved by the carrier 240 to any desired location on a masking sheet laid on the work surface 112. When the negative is thus clamped in a desired position, the punch apparatus may then be utilized to punch holes in any desired relation to the negative, and/or the negative may be directly fixed to the masking sheet by scotch taping parts of its edges thereto.

It should be readily understood that the second embodiment of the invention illustrated in FIGS. 10 to 17 and described above is usable in exactly the same manner as described for the first embodiment, FIGS. 1–9, when it is desired to punch horizontal or "stepping over" holes in a masking sheet. Therefore, no further description of such procedure will be given since the punch carriage, the gauge block and the stop member of the second embodiment perform their functions in the same manner as previously described for the first embodiment.

By provision of the attachable scale 210 and the auxiliary devices 220, 230 and 240, the punch apparatus is suitable for additional operations which would otherwise have to be performed on another work table. However, with the auxiliary devices, all of the operations necessary to properly prepare a masking sheet from start to finish can be performed on the punch apparatus. For example, necessary horizontal and vertical rulings as well as centering crosses may be applied to a masking sheet for placement of a negative by means of the horizontal straight edge 226, the vertical straight edge 210 and the leaf 230. Also, the negative 244 may be placed in any desired position on the masking sheet, taped thereto and the necessary "stepping over" holes punched with the negative secured to the sheet.

The punch apparatus of FIG. 10 is also adaptable to the punching of "stepping up" or vertically spaced openings at the opposite sides of the masking sheet. It will be noted that a scale 170 is supplied on the base in addition to the scales 189 and 215. The side walls 111 supporting the work surface also act as stops for the punch carriage whose movement from side to side is not impeded until the walls 111 are engaged, the strap 188 being adapted to ride over the right hand wall 111. Thus, if it is desired to punch vertically spaced holes in the masking sheet, the sheet is first positioned on the pins 118 and 120 and the punch carriage is moved against the right wall, or stop 111. Two holes are punched at the top and bottom in the right hand corners of the masking sheet. The punch carriage is then moved across the work table until it bears against the left wall or stop 111 and two holes are punched in the left corners of the masking sheet. The masking sheet 200 is then soft folded vertically to align the pairs of holes. The sheet is then turned 90° and, as illustrated in FIG. 17, placed over the pins 118 and 120 which have previously been moved to the openings 115 and 117. With the masking sheet thus supported on the work table, a series of vertically spaced holes 250–253 may be punched in the masking sheet.

With the described apparatus of FIG. 10, it is easy to punch holes anywhere on the masking sheet in both directions and obtain exact registration as required to all other punches. To accomplish this, it is merely necessary to set the locking member 192 for the desired spacing for cross punching and punch the desired number of steps. The punch carriage is then returned to the first station and measured ahead, or offset, a fixed spacing distance and the punch stepping repeated. The masking sheet may then be folded to register any two matching holes at the top and bottom, the fold being a flat, or hard, fold. The sheet is then turned 90° and the registered holes engaged over the pins relocated in the openings 115 and 117. A series of holes may then be punched at desired spacing for vertical stepping. This may be repeated for any number of vertical steps desired. The stepping holes thus punched will exactly register for both "stepping over" and "stepping up" no matter in what positions on the sheet they have been placed.

While the apparatus of the present invention has been described with reference to the making of printing plates, it will be apparent that its use is not limited to this alone and that it may advantageously be used whenever a series of equally or unequally spaced holes are to be punched in any sheet material, particularly where it is necessary to punch a pair of openings at opposite sides of the sheet simultaneously.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is.

1. A punching device for photographic masking sheets, comprising a continuous work surface, a pair of work locating pins projecting from said surface aligned with each other and with one horizontal edge of the work surface, said pins being spaced apart so that each pin is near an edge of the work supporting surface, a guide bar extending parallel to and near said one edge of the work surface, a carriage slidably mounted on said guide bar and extending perpendicular thereto and completely across and under the work surface, said carriage having end portions flush with said work surface and adapted to receive the work sheet horizontal edges on opposite sides of the work surface, punch means fixed to said carriage end portions for punching a pair of holes simultaneously in the work sheet at both edges thereof, a line between said punch means being perpendicular with respect to a line between said work locating pins, and a straight edge removably affixed to said carriage to overlie said work surface.

2. A punching device comprising a base, a guide bar mounted on the base, a carriage slidably mounted on said guide bar, punch means mounted on said carriage, a first block fixed to said carriage and slidably mounted on said guide bar, a clamp for locking said block in any desired position with respect to a series of graduations provided on said base and aligned with said guide bar, a second block slidably mounted on the guide bar, a second clamp for locking the second block at a desired location, a rod fixed at one end to said first block and extending parallel to said guide bar, said rod being slidably received in an aperture of said second block and protruding therethrough and a third block slidably mounted on the protruding end of said rod and provided with a third clamp for locking the block to the rod whereby said punch carriage may be automatically moved to punch a series of holes equally spaced apart by appropriately setting and locking said third block.

3. A punching device according to claim 2, wherein said blocks are each provided with a flat surface for close and accurate abutment on being pushed together, and each of said first and second blocks carries a pointer extending towards said graduations and having one edge registering with said flat surface.

4. A punching device the combination set forth in claim 2, wherein said guide bar is formed of round cross-section, and additionally a rail is provided parallel to the guide bar and having a rectangular cross-section, said first and second blocks being recessed to slidably receive said rail.

5. In a punching device, a base, a guide bar mounted on the base spaced therefrom, a carriage slidably mounted on said guide bar, punch means mounted on said carriage, a clamp for locking said carriage in any desired position with respect to a series of graduations provided on said base and aligned with said guide bar, a guage block slidably mounted on the guide bar, a second clamp for locking the gauge block at a desired location, a rod fixed at one end to said carriage and extending parallel to said guide bar, said rod being slidably received in an aperture of said guage block and protruding therethrough, and a stop member slidably mounted on the protruding end of said rod and provided with a third clamp for locking the stop to the rod whereby said punch carriage may be automatically moved to punch a series of holes equally spaced apart by appropriately setting and locking said stop member.

6. A punching device for photograph masking sheets comprising a work surface, a pair of horizontally aligned work locating pins extending from said surface and spaced apart so that each pin is near a lateral edge of the work supporting surface, a guide bar extending parallel to and near one horizontal edge of said work surface, a carriage freely slideable on said guide bar and extending from said one horizontal edge to another horizontal edge of the work surface, said carriage having portions at both ends flush with said work surface and adapted to receive the work sheet horizontal edges on opposite sides of the work surface, punch means carried by said carriage portions for punching holes in a work sheet at both horizontal edges, said punch means being perpendicularly aligned with respect to a line between said work locating pins, means on said carriage for locking the carriage to said guide bar, a guage block slidably mounted on the guide bar and having adjustable locking means for selectively clamping the guage block at any desired position with respect to a scale provide adjacent said guide bar and aligned therewith, a rod fixed to said carriage and extending parallel to the guide bar, said rod being slidably received in an aperture provided in said guage block and protruding therethrough and stop means slidably mounted on the protruding end of said rod and having means for clamping the stop at any desired location whereby the punch carriage may be automatically moved to punch a series of holes equally spaced apart a desired distance by appropriate setting and locking said stop means.

7. A punching device for photograph masking sheets as set forth in claim 6, wherein one of said work locating pins is mounted for rectilinear movement and provided with means for resiliently urging the said pin away from the other work locating pin whereby to tension and pick up slack in a work sheet placed on the work surface with locating openings receiving said pins.

8. A punching device according to claim 6, wherein said work locating pins are removably supported in a first pair of openings in said work surface, and a second pair of openings is formed in the work surface near said one horizontal edge, said pins being shiftable from said first to said second pair of openings.

9. A punching device according to claim 6, wherein said carriage is additionally provided with means for removably affixing a straight edge to overlie a masking sheet positioned on said work surface, said straight edge when affixed lying perpendicular to a line between said work locating pins.

10. A punching device according to claim 9, wherein is additionally provided at least one accessory device for lining, centering or holding a negative on a masking sheet positioned in the work surface, said device being removably, slidably and clampingly mounted on said straight edge.

11. A punching device according to claim 10, wherein said accessory device comprises a base member having a channel to slidingly receive said straight edge and a clamp carried by the base member to lock the member to the straight edge.

12. A punching device according to claim 11, wherein said accessory device further comprises pivoted grip means for releasably holding a negative.

13. A punching device according to claim 11, wherein said accessory device further comprises a second straight edge extending perpendicular to said first named straight edge.

14. A punching device according to claim 11, wherein said accessory device further comprises a leaf gripped by the base member so as to overlie the work surface, said leaf having a plurality of cutouts arranged to present perpendicular crossing edges for penciling centering marks on a masking sheet lying on said work surface.

15. In a punching device, a base, a work table supported above said base, a guide bar mounted parallel to one edge of the work table, a carriage slidably mounted on said guide bar, punch means mounted on said carriage, a clamp for locking said carriage in any desired position, a guage block slidably mounted on the guide bar, a second clamp for locking the guage block at a desired location, a rod fixed at one end to said carriage and extending parallel to said guide bar, said rod being slidably received in said guage block and protruding therethrough, and a stop member slidably mounted with respect to both said guide bar and the protruding end of said rod and provided with a third clamp for locking the stop to the rod.

16. A punching device according to claim 15, wherein said rod is of rectangular cross section and carries scale graduations, said stop member having a window through which said graduations are visible.

17. A punching device comprising a base, a guide bar mounted on the base, a carriage slidably mounted on said guide bar, punch means mounted on said carriage, a gauge block slidably mounted on the guide bar, a clamp for locking the gauge block at a desired location, a rod fixed at one end to said carriage and extending parallel to said guide bar, said rod being slidably received in an aperture of said gauge block and protruding therethrough, and a stop member slidably mounted on the protruding end of said rod and provided with a second clamp for locking the stop to the rod, whereby said punch carriage may be automatically moved to punch a series of holes equally spaced apart by appropriately setting and locking said stop member.

18. A punching device for photograph masking sheets as described in claim 17, wherein said carriage is supported at its end opposite the guide bar by a rolling element to reduce friction of movement of the carriage.

19. A device for preparing photograph masking sheets comprising a base, a guide bar mounted on the base spaced therefrom, a carriage slidably mounted on said guide bar, a straight edge mounted on said carriage perpendicular to said guide bar, a clamp for locking said carriage in any desired position with respect to a series of graduations provided on said base and aligned with said guide bar, a gauge block slidably mounted on the guide bar, a second clamp for locking the gauge block at a desired location, a rod fixed at one end to said carriage and extending parallel to said guide bar, said rod being slidably received in an aperture of said gauge block and protruding therethrough, and a stop member slidably mounted on the protruding end of said rod and provided with a third clamp for locking the stop to the rod, whereby said carriage and straight edge may be automatically moved equal distances along the guide bar by appropriately setting and locking said stop member.

References Cited in the file of this patent
UNITED STATES PATENTS

| | | |
|---|---|---|
| 749,593 | Trussell | Jan. 12, 1904 |
| 851,931 | Grossman | Apr. 30, 1907 |
| 2,785,751 | Jones | Mar. 19, 1957 |